US012413928B2

(12) United States Patent
Hata

(10) Patent No.: US 12,413,928 B2
(45) Date of Patent: Sep. 9, 2025

(54) VOICE PROCESSING SYSTEM, VOICE PROCESSING METHOD, AND RECORDING MEDIUM HAVING VOICE PROCESSING PROGRAM RECORDED THEREON

(71) Applicant: SHARP KABUSHIKI KAISHA, Sakai (JP)

(72) Inventor: Noriko Hata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 238 days.

(21) Appl. No.: 18/202,988

(22) Filed: May 29, 2023

(65) Prior Publication Data

US 2024/0015462 A1 Jan. 11, 2024

(30) Foreign Application Priority Data

Jul. 7, 2022 (JP) ................................. 2022-109688

(51) Int. Cl.
*H04S 7/00* (2006.01)
*H04R 29/00* (2006.01)

(52) U.S. Cl.
CPC ........... *H04S 7/304* (2013.01); *H04R 29/005* (2013.01)

(58) Field of Classification Search
None
See application file for complete search history.

(56) References Cited

U.S. PATENT DOCUMENTS

2013/0097505 A1* 4/2013 Millington ............... H04R 3/12 715/716
2022/0141604 A1* 5/2022 Udesen ................ H04R 25/407 381/315

FOREIGN PATENT DOCUMENTS

JP 2018-121256 A 8/2018

* cited by examiner

*Primary Examiner* — Kenny H Truong
(74) *Attorney, Agent, or Firm* — ScienBiziP, P.C.

(57) ABSTRACT

A voice processing system according to an embodiment includes: an estimation processing unit which executes transmission and reception of voice data between microphone-speaker devices and a communication device, thereby estimating the position of each of the microphone-speaker devices relative to the communication device; and a display processing unit which displays, on a display, the position of the microphone-speaker device estimated by the estimation processing unit.

11 Claims, 13 Drawing Sheets

FIG. 4

D1

SETTING INFORMATION

| DEVICE ID | POSITIONAL INFORMATION | VOLUME | MICROPHONE GAIN | ... |
| --- | --- | --- | --- | --- |
| MS001 | P1 | V1 | G1 | ... |
| MS002 | P2 | V2 | G2 | ... |
| MS003 | P3 | V3 | G3 | ... |
| MS004 | P4 | V4 | G4 | ... |

VOICE PROCESSING SYSTEM, VOICE PROCESSING METHOD, AND RECORDING MEDIUM HAVING VOICE PROCESSING PROGRAM RECORDED THEREON

INCORPORATION BY REFERENCE

This application is based upon and claims the benefit of priority from the corresponding Japanese Patent Application No. 2022-109688 filed on Jul. 7, 2022, the entire contents of which are incorporated herein by reference.

BACKGROUND

The present disclosure relates to a voice processing system which performs transmission and reception of voice by a microphone-speaker device, a voice processing method, and a recording medium having a voice processing program recorded thereon.

Conventionally, neck-hanging-type microphone-speaker devices which can be worn around the user's neck are known. By using the microphone-speaker device as mentioned above, the user can hear reproduced voice without having his or her own ears being plugged and can also have the speech voice collected without preparing a device for sound collection.

The microphone-speaker device is connected to a control device such as a personal computer, for example, and the control device can display setting information of the microphone-speaker device. For example, the control device displays identification information (a device number), a microphone gain, and a speaker volume of the microphone-speaker device.

Here, for example, a case where a plurality of users respectively wear the microphone-speaker devices and conduct a meeting is assumed. When a plurality of microphone-speaker devices are used simultaneously within the same area as in the above case, if the device numbers of the respective microphone-speaker devices are displayed on the control device, it becomes difficult for the users to ascertain the microphone-speaker device that the user himself/herself is wearing, and it is also difficult to ascertain the setting content.

SUMMARY

An object of the present disclosure is to provide a voice processing system which allows, when microphone-speaker devices are used, a user to easily ascertain each microphone-speaker device, a voice processing method, and a recording medium having a voice processing program recorded thereon.

A voice processing system according to one aspect of the present disclosure pertains to a system including a microphone-speaker device of a portable type carried by a user, and a communication device installed in a predetermined area in which the user is accommodated. The voice processing system is provided with an estimation processing unit and a display processing unit. The estimation processing unit estimates the position of the microphone-speaker device relative to the communication device by executing transmission and reception of data between the microphone-speaker device and the communication device. The display processing unit displays, on a display, the position of the microphone-speaker device estimated by the estimation processing unit.

A voice processing method according to another aspect of the present disclosure pertains to a method which involves use of a microphone-speaker device of a portable type carried by a user, and a communication device installed in a predetermined area in which the user is accommodated. In the voice processing method, one or more processors execute: estimating the position of the microphone-speaker device relative to the communication device by performing transmission and reception of data between the microphone-speaker device and the communication device; and displaying the estimated position of the microphone-speaker device on a display.

A recording medium according to yet another aspect of the present disclosure pertains to a recording medium having recorded thereon a voice processing program comprising instructions for a microphone-speaker device of a portable type carried by a user, and a communication device installed in a predetermined area in which the user is accommodated. Further, the voice processing program is a program for causing one or more processors to execute: estimating the position of the microphone-speaker device relative to the communication device by performing transmission and reception of data between the microphone-speaker device and the communication device; and displaying the estimated position of the microphone-speaker device on a display.

According to the present disclosure, it is possible to provide a voice processing system which allows, when microphone-speaker devices are used, a user to easily ascertain each microphone-speaker device, a voice processing method, and a recording medium having a voice processing program recorded thereon.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a table showing an example of setting information used by the voice processing system according to the embodiment of the present disclosure.

DETAILED DESCRIPTION

Embodiments of the present disclosure will be described below with reference to the accompanying drawings. Note that the following embodiments are merely examples that embody the present disclosure, and are not intended to limit the technical scope of the disclosure.

A voice processing system according to the present disclosure can be applied to, for example, a case where a plurality of users conduct a meeting by using microphone-speaker devices, respectively, in a meeting room. The microphone-speaker device is a portable audio device carried by the user. Further, the microphone-speaker device has a neckband shape, for example, and each user wears the microphone-speaker device around his/her neck to attend the meeting. Each user can hear a voice reproduced from a speaker of the microphone-speaker device, and can also cause a microphone of the microphone-speaker device to collect a voice uttered by the user himself/herself. Note that the voice processing system according to the present disclosure can also be applied to a case of conducting an online meeting in which a plurality of users at multiple sites use microphone-speaker devices, respectively, and transmit and receive voice data via a network.

Voice Processing System 100

Figure 1:
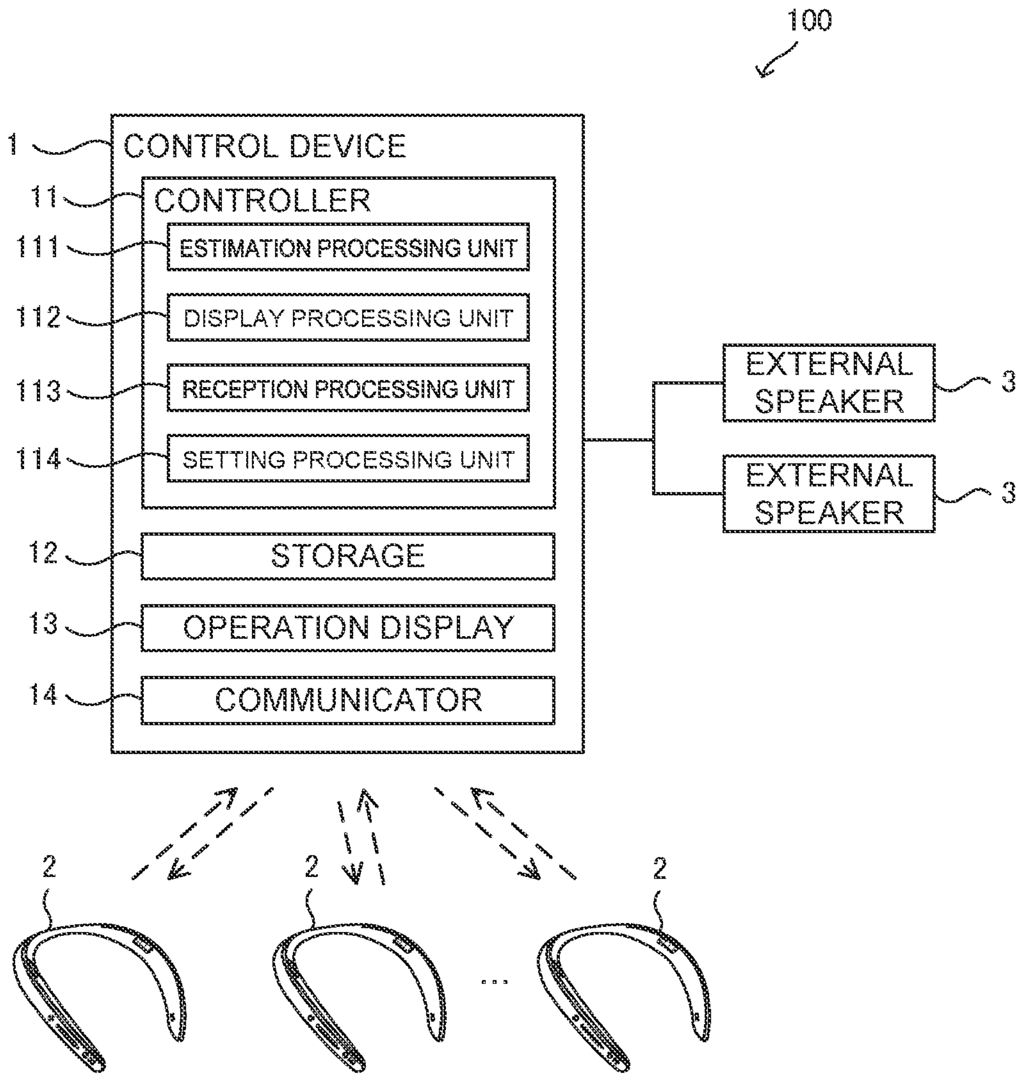
FIG. 1 is a diagram illustrating a configuration of a voice processing system according to an embodiment of the present disclosure.

FIG. 1 is a diagram illustrating a configuration of a voice processing system 100 according to an embodiment of the present disclosure. The voice processing system 100 includes a control device 1, a microphone-speaker device 2, and an external speaker 3. The microphone-speaker device 2 is an audio device equipped with a microphone 24 and a speaker 25 (see FIG. 3). The microphone-speaker device 2 may have the function of an AI speaker, a smart speaker, and the like, for example. The voice processing system 100 is a system which includes a plurality of wearable microphone-speaker devices 2 to be worn by a plurality of users, respectively, and executes transmission and reception of voice data corresponding to the user's speech voice among the plurality of microphone-speaker devices 2. The voice processing system 100 is an example of the voice processing system of the present disclosure.

The control device 1 controls each of the microphone-speaker devices 2 and executes, when a meeting is started in a meeting room, for example, processing of transmitting and receiving voices between each of the microphone-speaker devices 2. Note that the control device 1 alone may constitute the voice processing system according to the present disclosure. When the voice processing system of the present disclosure is to be constituted by the control device 1 alone, the control device 1 may accumulate voices acquired from the microphone-speaker device 2 as voice for recording, and execute processing of having the acquired voice recognized within the device itself (i.e., voice recognition processing). Further, the voice processing system of the present disclosure may include various servers which provide various services such as a meeting service, a subtitling service by voice recognition, a translation service, and a minutes service.

The external speaker 3 is installed, for example, in a meeting room, and can reproduce a voice output from the control device 1, a voice which has been collected by the microphone-speaker device 2, and the like.

The present embodiment will be described with reference to a meeting indicated in FIG. 2 as an example. Users A, B, C, and D, who are attendees of the meeting mentioned above, wear microphone-speaker devices 2A, 2B, 2C, and 2D, respectively, around their necks in a meeting room R1, and attend the meeting. Further, the control device 1 and external speakers 3*a* and 3*b* are installed in the meeting room R1. The control device 1 and the microphone-speaker devices 2A, 2B, 2C, 2D are connected to each other by wireless communication such as Bluetooth (registered trademark). The control device 1 and the external speakers 3*a* and 3*b* are connected to each other via an audio cable, a USB cable, a wired LAN, etc.

Specifically, when the control device 1 acquires data corresponding to speech voice of user A from the microphone-speaker device 2A, the control device 1 may transmit the voice data to each of the microphone-speaker devices 2B, 2C, and 2D of users B, C, and D, and cause each of the microphone-speaker devices 2B, 2C, and 2D to reproduce the speech voice. Further, when the control device 1 acquires data corresponding to speech voice of user B from the microphone-speaker device 2B, the control device 1 may transmit the voice data to each of the microphone-speaker devices 2A, 2C, and 2D of users A, C, and D, and cause each of the microphone-speaker devices 2A, 2C, and 2D to reproduce the speech voice. Furthermore, the control device 1 may cause each of the external speakers 3*a* and 3*b* to reproduce, from the external speakers 3*a* and 3*b*, a speech voice acquired from the microphone-speaker device 2.

Microphone-Speaker Device 2

Figure 3:
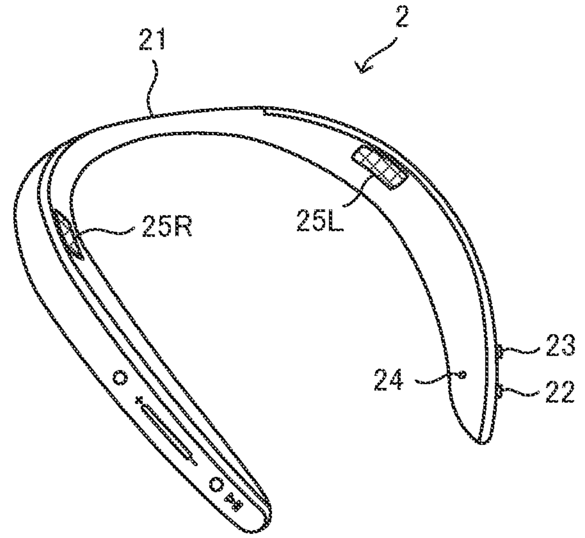
FIG. 3 is an external view illustrating a configuration of a microphone-speaker device according to the embodiment of the present disclosure.

FIG. 3 illustrates an example of the outer appearance of the microphone-speaker device 2. As illustrated in FIG. 3, the microphone-speaker device 2 is provided with a power source 22, a connection button 23, the microphone 24, the speaker 25, and a communicator (not shown). The microphone-speaker device 2 is, for example, a neckband-type wearable device that can be worn around the user's neck. The microphone-speaker device 2 acquires a voice of a user through the microphone 24 and reproduces (outputs) a voice to the user from the speaker 25. The microphone-speaker device 2 may be provided with a display which displays various kinds of information.

As illustrated in FIG. 3, a main body 21 of the microphone-speaker device 2 has left and right arms as seen from the user wearing the microphone-speaker device 2, and is formed to be U-shaped.

The microphone 24 is disposed at a distal end portion of the microphone-speaker device 2 so that the user's speech voice can be easily collected. The microphone 24 is connected to a microphone substrate (not shown) incorporated in the microphone-speaker device 2.

The speaker 25 includes, as seen from the user wearing the microphone-speaker device 2, a speaker 25L disposed on the left arm and a speaker 25R disposed on the right arm. Each of the speakers 25L and 25R is disposed near the center of the arm of the microphone-speaker device 2 such that the user can easily hear a voice reproduced therefrom. The speakers 25L and 25R are connected to a speaker substrate (not shown) incorporated in the microphone-speaker device 2.

The microphone substrate is a transmitter substrate for transmitting the voice data to the control device 1, and is included in the communicator. Further, the speaker substrate is a receiver substrate for receiving the voice data from the control device 1, and is included in the communicator.

The communicator is a communication interface for enabling, wirelessly, execution of data communication according to a predetermined communication protocol between the microphone-speaker device 2 and the control device 1. Specifically, the communicator performs the communication by establishing connection between the microphone-speaker device 2 and the control device 1 by a Bluetooth method, for example. For example, when the user presses the connection button 23 after setting the power source 22 to ON, the communicator executes pairing processing to connect the microphone-speaker device 2 to the control device 1. A transmitter device may be arranged between the microphone-speaker device 2 and the control device 1. In such a case, the transmitter device may be paired (Bluetooth connected) with the microphone-speaker device 2, and the transmitter device and the control device 1 may be connected to each other via the Internet.

Control Device 1

As illustrated in FIG. 1, the control device 1 is an information processor (e.g., a personal computer) which is provided with a controller 11, a storage 12, an operation display 13, a communicator 14, and the like. Note that the control device 1 is not limited to being a single computer, but may be a computer system in which a plurality of computers operate in cooperation with each other. Further, various kinds of processing to be executed by the control device 1 may be executed decentrally by one or more processors.

The communicator 14 is a communicator for connecting the control device 1 to a communication network in a wired or wireless manner, thereby executing data communication according to a predetermined communication protocol with the microphone-speaker devices 2 and external devices such as the external speakers 3*a* and 3*b*, via the communication network. For example, the communicator 14 executes the pairing processing by the Bluetooth method, and is connected to the microphone-speaker device 2. Also, the communicator 14 is connected to the external speakers 3*a* and 3*b* via the audio cable, USB cable, wired LAN, etc.

The operation display 13 is a user interface including a display such as a liquid crystal display or an organic EL display which displays various kinds of information, and an operation portion such as a mouse, a keyboard, or a touch panel which receives operations. The display may be configured separately from the control device 1, and may be connected to the control device 1 in a wired or wireless manner.

The storage 12 is a non-volatile storage, such as a hard disk drive (HDD) or a solid state drive (SSD), which stores various kinds of information. Specifically, the storage 12 stores data such as setting information D1 of the microphone-speaker devices 2.

FIG. 4 illustrates an example of the setting information D1. As illustrated in FIG. 4, the setting information D1 includes information such as "Device ID", "Positional Information", "Volume", and "Microphone Gain". The "Device ID" is identification information of each of the microphone-speaker devices 2. For example, a device number is registered as the device ID. In this example, "MS001" to "MS004" correspond to the microphone-speaker devices 2A to 2D, respectively. The "Positional Information" is information which indicates the position of the microphone-speaker device 2 in a meeting room. The controller 11 estimates the respective positions of the microphone-speaker devices 2A to 2D in the meeting room and registers the estimated positional information in the setting information D1. A method of estimating the position of the microphone-speaker device 2 will be described later.

The "Volume" indicates a reproduction volume (a speaker volume) of the speaker 25 of each of the microphone-speaker devices 2, and the "Microphone Gain" indicates a gain of the microphone 24 of each of the microphone-speaker devices 2. The speaker volume and the microphone gain mentioned above are one example of the setting information of the microphone-speaker device of the present disclosure. Note that the setting information may include, in addition to the speaker volume and the microphone gain, information related to functions such as mute, voice recognition, translated voice, and equalizer. The controller 11 registers each piece of the above information in the setting information D1 every time the microphone-speaker device 2 is connected.

The user can, for example, operate (i.e., operate by a touch) a setting screen F1 (FIG. 6, etc.) displayed on the operation display 13 to perform an operation of setting or changing various setting items (speaker volume, microphone gain, mute, voice recognition, translated voice, equalizer, etc.). The controller 11 registers and updates the setting information D1 in response to the user operation. In addition, the controller 11 registers the setting information in advance on the basis of the user operation or default settings.

Further, the storage 12 stores a control program such as a voice control program for causing the controller 11 to execute voice control processing (FIG. 8) to be described later. For example, the voice control program may be recorded, in a non-transitory way, on a computer-readable recording medium such as a CD or a DVD, and be read by a reading device (not shown) such as a CD drive or a DVD drive provided in the control device 1 to be stored in the storage 12.

The controller 11 includes control devices such as a CPU, a ROM, and a RAM. The CPU is a processor which executes various kinds of arithmetic processing. The ROM is a non-volatile storage which stores in advance control programs such as a BIOS and an OS for causing the CPU to execute the various kinds of arithmetic processing. The RAM is a volatile or non-volatile storage which stores various kinds of information, and is used as a temporary storage memory (a work area) for various kinds of processing to be executed by the CPU. Further, the controller 11 controls the control device 1 by using the CPU to execute various control programs stored in advance in the ROM or the storage 12.

Specifically, the controller 11 includes, as illustrated in FIG. 1, various processing units such as an estimation processing unit 111, a display processing unit 112, a reception processing unit 113, and a setting processing unit 114. The controller 11 functions as the above various processing units by using the CPU to execute various kinds of processing according to the control program. Moreover, some or all of the processing units may be configured by an electronic circuit. Note that the control program may be a program for causing a plurality of processors to function as the above-mentioned processing units.

The estimation processing unit 111 estimates the position of each of the plurality of microphone-speaker devices 2. Specifically, the estimation processing unit 111 estimates the position of each of the microphone-speaker devices 2 in a predetermined area (in this case, the meeting room R1) where the plurality of microphone-speaker devices 2 and the external speakers 3*a* and 3*b* are arranged. For example, the estimation processing unit 111 estimates the position of each of the microphone-speaker devices 2A to 2D relative to the external speakers 3*a* and 3*b* in the meeting room R1.

Figure 5:
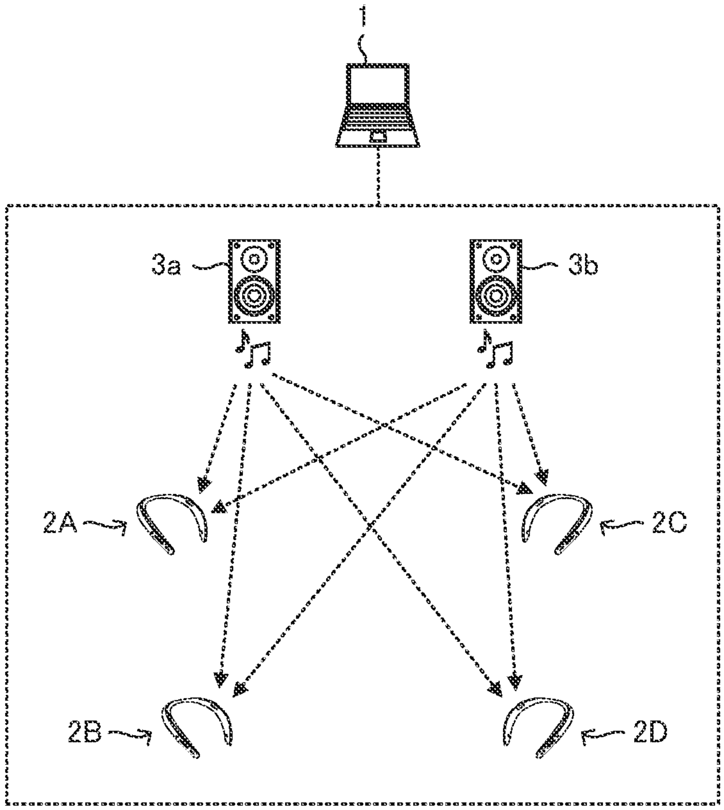
FIG. 5 is a diagram showing an example of a method of estimating the position of the microphone-speaker device according to the embodiment of the present disclosure.

FIG. 5 illustrates an example of a method of estimating the position of the microphone-speaker device 2. For example, as illustrated in FIG. 5, the estimation processing unit 111 makes a first specific sound (e.g., a test sound) be reproduced from the external speaker 3*a*. The first specific sound is input to (collected through) each of the microphone 24 of the microphone-speaker device 2A, the microphone 24 of the microphone-speaker device 2B, the microphone 24 of the microphone-speaker device 2C, and the microphone 24 of the microphone-speaker device 2D. The estimation processing unit 111 acquires, from each of the microphone-speaker devices 2A to 2D, the first specific sound that has been collected. The estimation processing unit 111 measures the length of time from when the external speaker 3*a* is made to reproduce the first specific sound to when the first specific sound is acquired by each of the microphone-speaker devices 2A to 2D, thereby calculating a distance from the external speaker 3*a* to each of the microphone-speaker devices 2A to 2D.

Similarly, the estimation processing unit 111 makes a second specific sound be reproduced from the external speaker 3*b*. The second specific sound is input to (collected through) each of the microphone 24 of the microphone-speaker device 2A, the microphone 24 of the microphone-speaker device 2B, the microphone 24 of the microphone-speaker device 2C, and the microphone 24 of the microphone-speaker device 2D. The estimation processing unit 111 acquires, from each of the microphone-speaker devices 2A to 2D, the second specific sound that has been collected. The estimation processing unit 111 measures the length of time from when the external speaker 3*b* is made to reproduce the second specific sound to when the second specific sound is acquired by each of the microphone-speaker devices 2A to 2D, thereby calculating a distance from the external speaker 3*b* to each of the microphone-speaker devices 2A to 2D.

Further, the estimation processing unit 111 estimates the position of each of the microphone-speaker devices 2A to 2D relative to the external speakers 3*a* and 3*b*, on the basis of the distance from the external speaker 3*a* to each of the microphone-speaker devices 2A to 2D and the distance from the external speaker 3*b* to each of the microphone-speaker devices 2A to 2D.

As can be seen, the estimation processing unit 111 estimates the position of each of the plurality of microphone-speaker devices 2 relative to the external speaker 3 by executing transmission and reception of voice data between each of the plurality of microphone-speaker devices 2 and the external speaker 3. The estimation processing unit 111 registers the positional information indicating the estimated position of each of the microphone-speaker devices 2A to 2D in the setting information D1 (FIG. 4). The method of estimating the position of the microphone-speaker device 2 is not limited to the above-described method, but may be any of the other methods to be described later. Alternatively, the estimation processing unit 111 may execute transmission and reception of voice data between a single microphone-speaker device 2 and the external speaker 3, thereby estimating the position of the microphone-speaker device 2 relative to the external speaker 3.

The display processing unit 112 displays, on the operation display 13, the respective positions of the plurality of microphone-speaker devices 2 estimated by the estimation processing unit 111. Also, the display processing unit 112 displays, on the operation display 13, the setting screen F1 for setting each of setting items of the plurality of microphone-speaker devices 2. In addition, the display processing unit 112 displays, on the operation display 13, the setting information of each of the plurality of microphone-speaker devices 2.

Figure 6:
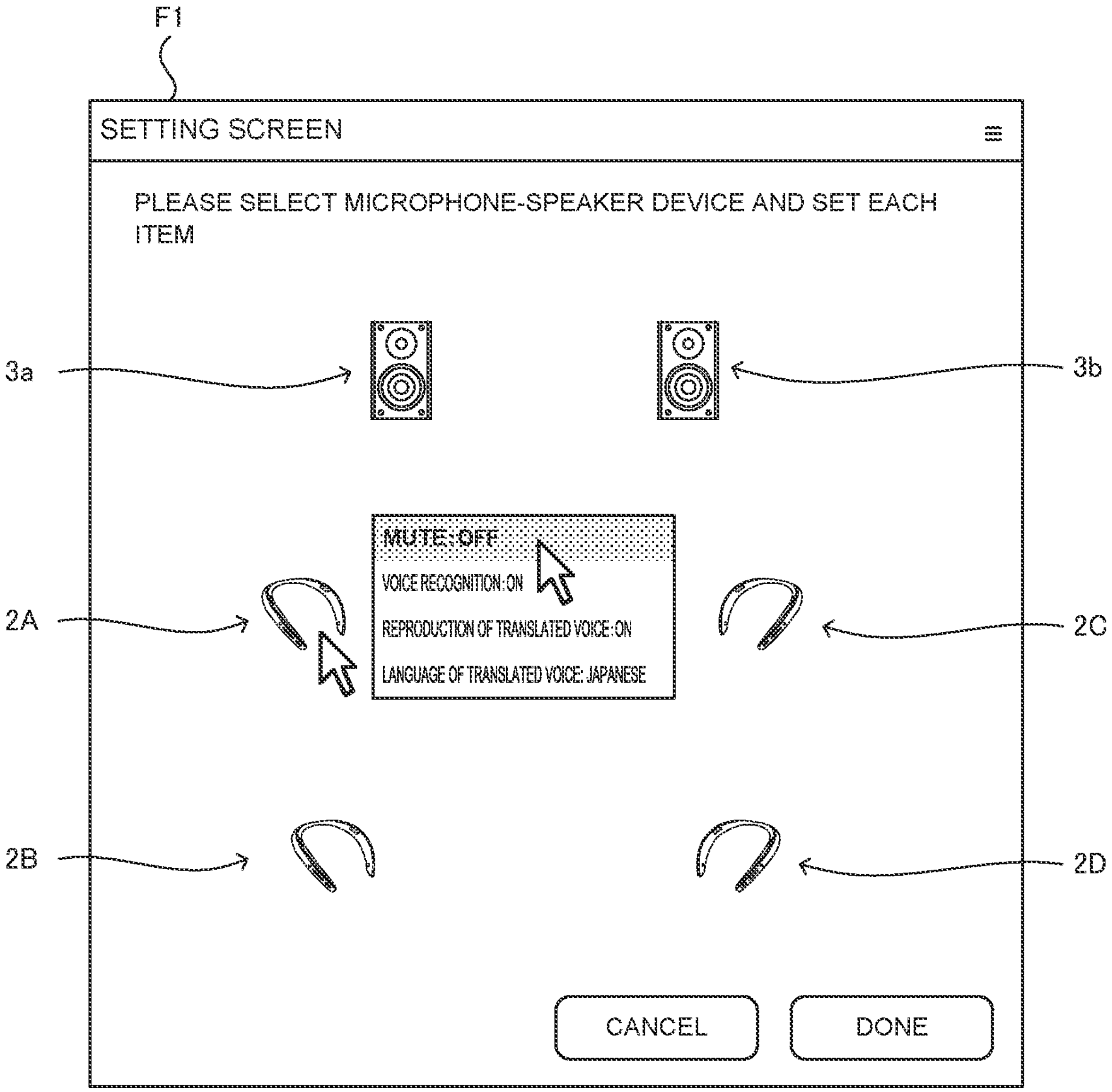
FIG. 6 is a diagram showing an example of a setting screen displayed in the voice processing system according to the embodiment of the present disclosure.

FIG. 6 illustrates an example of the setting screen F1. For example, as illustrated in FIG. 6, the display processing unit 112 displays, on the setting screen F1, images corresponding to the external speakers 3*a* and 3*b* installed in the meeting room R1 and images corresponding to the microphone-speaker devices 2A to 2D, respectively. Specifically, the display processing unit 112 displays, on the setting screen F1, the respective images of the microphone-speaker devices 2A to 2D at display positions corresponding to the positions estimated by the estimation processing unit 111. The display processing unit 112 may display identification information (the device number or the like) (see FIG. 4) of the microphone-speaker device 2 for each of the images of the microphone-speaker devices 2. Also, if user information (user ID, user name, etc.) is registered for each microphone-speaker device 2, the display processing unit 112 may display the user information at each of the images of the microphone-speaker devices 2.

According to the setting screen F1 illustrated in FIG. 6, the user can easily ascertain the position of each of the microphone-speaker devices 2 with respect to the external speakers 3*a* and 3*b*. Note that the display processing unit 112 may display, on the operation display 13, the position of a single microphone-speaker device 2 estimated by the estimation processing unit 111.

The reception processing unit 113 receives, on the operation display 13, a setting operation for the setting items of each of the plurality of microphone-speaker devices 2 from the user. For example, on the setting screen F1 illustrated in FIG. 6, the reception processing unit 113 receives the setting operation for the setting items of the microphone-speaker device 2 from the user. Specifically, when the user selects (by a touch operation, a click operation, etc.) the microphone-speaker device 2A on the setting screen F1 illustrated in FIG. 6, for example, the reception processing unit 113 displays a plurality of setting items of the microphone-speaker device 2A. In this case, the reception processing unit 113 displays the setting items, which are “Mute”, “Voice Recognition”, “Reproduction of Translated Voice”, and “Language of Translated Voice”, and receives the setting operation from the user. FIG. 6 illustrates the state in which the user has made the setting for “Mute” of the microphone-speaker device 2A to “OFF”.

The setting processing unit 114 sets the setting items of each of the microphone-speaker devices 2 according to the setting operation by the user. For example, when the user selects the microphone-speaker device 2A and performs the setting operation for each of the setting items, the setting processing unit 114 sets each of the setting items for the microphone-speaker device 2A. Further, for example, when the user selects the microphone-speaker device 2B and performs the setting operation for each of the setting items, the setting processing unit 114 sets each of the setting items for the microphone-speaker device 2B. In this way, the setting processing unit 114 sets each of the setting items on the basis of the setting operation by the user for each of the microphone-speaker devices 2 on the setting screen F1.

Figure 2:
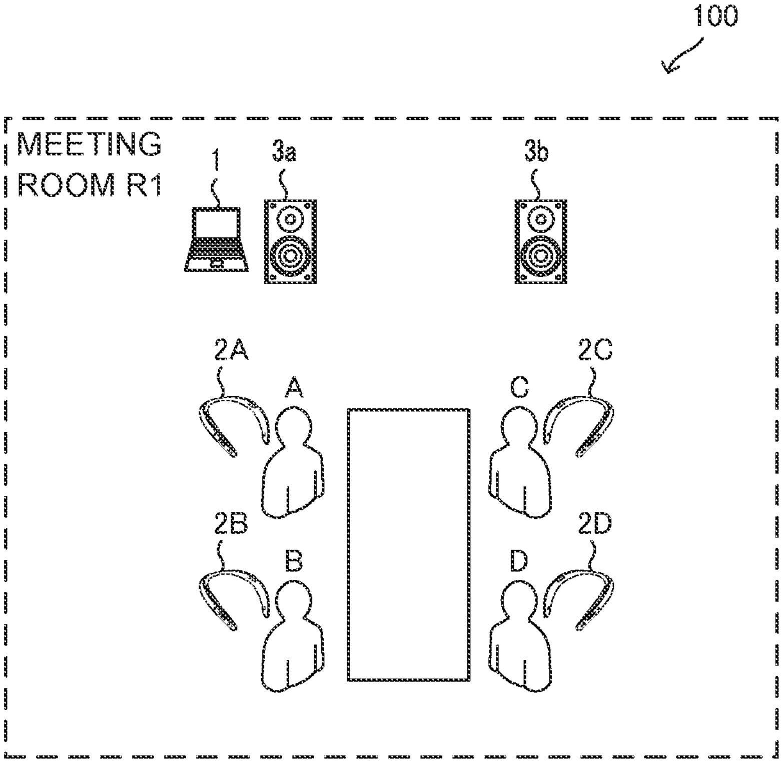
FIG. 2 is a diagram illustrating an example of application of the voice processing system according to the embodiment of the present disclosure.

In the example illustrated in FIG. 2, an organizer of the meeting, for example, collectively performs the setting operations for the respective microphone-speaker devices 2A to 2D, and the setting processing unit 114 sets each of the microphone-speaker devices 2A to 2D on the basis of the setting operations. In addition, the setting processing unit 114 may set the speaker volume and the microphone gain, etc., according to the setting operation by the user for each of the microphone-speaker devices 2A to 2D.

The setting processing unit 114 registers the setting content of each of the microphone-speaker devices 2A to 2D in the setting information D1 (FIG. 4).

When the setting processing unit 114 completes the setting for each of the microphone-speaker devices 2A to 2D, users A to D, for example, can conduct a meeting using the microphone-speaker devices 2A to 2D. For example, when user A speaks, the controller 11 may acquire the speech voice of user A from the microphone-speaker device 2A and make that speech voice be reproduced from each of the microphone-speaker devices 2B to 2D. Further, for example, when user B speaks, the controller 11 may acquire the speech voice of user B from the microphone-speaker device 2B and make that speech voice be reproduced from each of the microphone-speaker devices 2A, 2C, and 2D. For example, in a situation in which users B to D are wearing earphones or the like and it is difficult to hear the speech voice of user A, the controller 11 may make the speech voice of user A acquired from the microphone-speaker device 2A be reproduced from each of microphone-speaker devices 2B to 2D. Further, for example, if a language used by user A is different from languages used by users B to D, the controller 11 may make a voice corresponding to a translation of the speech voice of user A be reproduced from each of the microphone-speaker devices 2B to 2D. In this way, the controller 11 may transmit and receive voice data between the microphone-speaker devices 2A to 2D on the basis of the setting content registered in the setting information D1. In addition, the controller 11 may make the voice data be reproduced from the external speakers 3*a* and 3*b*, if necessary. Further, the controller 11 may, for example, make the speech voice of a user at a different site (a remote location) from the meeting room R1 be reproduced from the microphone-speaker devices 2A to 2D.

Figure 7:
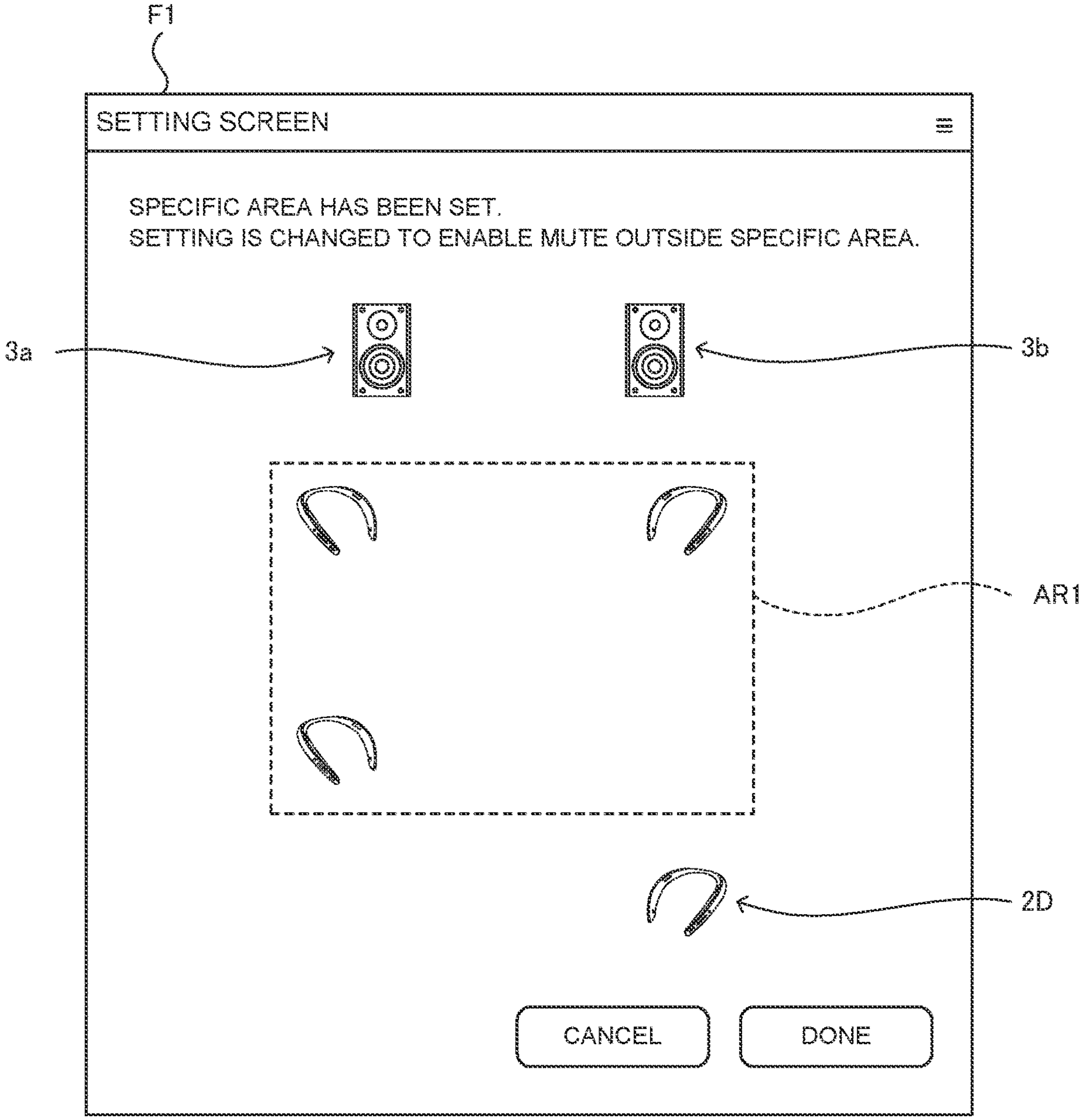
FIG. 7 is a diagram showing an example of a setting screen displayed in the voice processing system according to the embodiment of the present disclosure.

Here, the setting processing unit 114 may change the setting content of the microphone-speaker devices 2A to 2D during the meeting. Specifically, the setting processing unit 114 sets a specific place relative to the external speakers 3*a* and 3*b* to a specific area AR1. For example, the setting processing unit 114 sets an area including the microphone-speaker devices 2A to 2D in the meeting room R1 (FIG. 2) as the specific area AR1. The display processing unit 112 displays the specific area AR1 on the setting screen F1 (FIG. 7). In a state in which the specific area AR1 is set, when the microphone-speaker device 2D is moved outside the specific area AR1 from within the specific area AR1 (see FIG. 7) as user D who is wearing the microphone-speaker device 2D leaves the meeting room R1 during the meeting, for example, the setting processing unit 114 changes the setting content of the microphone-speaker device 2D. For example, the setting processing unit 114 changes the setting content for mute of the microphone-speaker device 2D from "OFF" to "ON". In other words, the setting processing unit 114 sets the microphone 24 and the speaker 25 of the microphone-speaker device 2D to OFF.

As a result, voice is no longer reproduced from the speaker 25 of the microphone-speaker device 2D, and the speech voice of user D is also no longer collected by the microphone 24. This allows, for example, user D to leave his/her seat with the microphone-speaker device 2D being worn even when user D needs to leave his/her seat to answer a phone call during the meeting, and there is also no need for user D to perform an operation to change the setting content of the microphone-speaker device 2D himself/herself.

As described above, when the setting processing unit 114 has set the specific area AR1, the setting processing unit 114 may vary the setting content between the microphone-speaker device 2 located within the specific area AR1 among the plurality of microphone-speaker devices 2 and the microphone-speaker device 2 located outside the specific area AR1 among the plurality of microphone-speaker devices 2. Note that the setting processing unit 114 may set the setting items of a single microphone-speaker device 2 according to the setting operation by the user.

Further, when the microphone-speaker device 2D is moved outside the specific area AR1 from within the specific area AR1, the display processing unit 112 displays, on the setting screen F1, an image of the microphone-speaker device 2D outside the specific area AR1 (see FIG. 7). This allows the user to keep track of changes in the position of each of the microphone-speaker devices 2. When the user selects the microphone-speaker device 2D on the setting screen F1 illustrated in FIG. 7, the display processing unit 112 displays the changed setting content (Mute: ON).

Voice Control Processing

Figure 8:
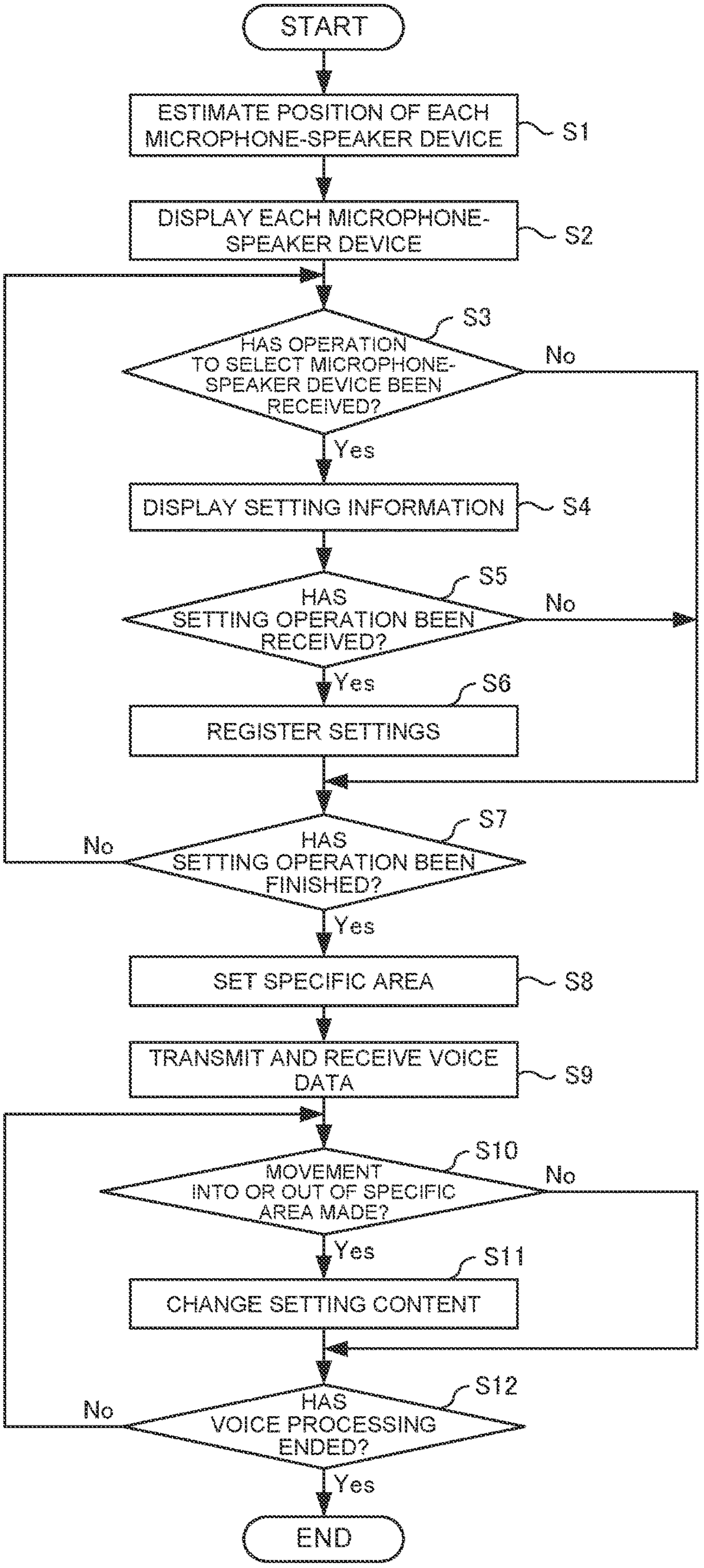
FIG. 8 is a flowchart for illustrating an example of a procedure of voice control processing executed in the voice processing system according to the embodiment of the present disclosure.

Now, with reference to FIG. 8, an example of a procedure of voice control processing executed by the controller 11 of the control device 1 will be described.

The present disclosure can be regarded as a voice control method of executing one or more steps included in the voice control processing (i.e., a voice processing method of the present disclosure). Further, the one or more steps included in the voice control processing described herein may be omitted as appropriate. Furthermore, the order in which the steps of the voice control processing are executed may be varied as long as the same effect and advantage are produced. Moreover, although a case where the controller 11 executes each step of the voice control processing will be described herein as an example, in other embodiments, one or more processors may execute each step of the voice control processing in a decentralized manner.

First, in step S1, the controller 11 estimates the position of each of the microphone-speaker devices 2. In the example illustrated in FIG. 2, when each of the microphone-speaker devices 2A to 2D is connected to the control device 1, the controller 11 executes processing of estimating the position of each of the microphone-speaker devices 2A to 2D. Specifically, the controller 11 makes a first specific sound (a test sound) be reproduced from the external speaker 3*a*. Next, the controller 11 acquires, from each of the microphone-speaker devices 2A to 2D, the first specific sound collected by each of the microphone-speaker devices 2A to 2D. Next, the controller 11 calculates a distance from the external speaker 3*a* to each of the microphone-speaker devices 2A to 2D, on the basis of the length of time from when the external speaker 3*a* reproduces the first specific sound to when the first specific sound is acquired from each of the microphone-speaker devices 2A to 2D.

Similarly, the controller 11 makes a second specific sound be reproduced from the external speaker 3*b*. Next, the controller 11 acquires, from each of the microphone-speaker devices 2A to 2D, the second specific sound collected by each of the microphone-speaker devices 2A to 2D. The controller 11 calculates a distance from the external speaker 3*b* to each of the microphone-speaker devices 2A to 2D, on the basis of the length of time from when the external speaker 3*b* is made to reproduce the second specific sound to when the second specific sound is acquired from each of the microphone-speaker devices 2A to 2D.

Further, the controller 11 estimates the position of each of the microphone-speaker devices 2A to 2D relative to the external speakers 3*a* and 3*b*, on the basis of the distance from the external speaker 3*a* to each of the microphone-speaker devices 2A to 2D and the distance from the external speaker 3*b* to each of the microphone-speaker devices 2A to 2D. In other words, the controller 11 estimates the position of each of the microphone-speaker devices 2A to 2D with respect to the external speakers 3*a* and 3*b*. The controller 11 registers positional information indicating the estimated position of each of the microphone-speaker devices 2A to 2D in the setting information D1 (FIG. 4).

Next, in steps S2, the controller 11 displays the estimated position of each of the plurality of microphone-speaker devices 2 on the operation display 13. For example, the controller 11 displays, on the setting screen F1 illustrated in FIG. 6, the position of each of the microphone-speaker devices 2A to 2D relative to the external speakers 3*a* and 3*b* in an identifiable manner.

Next, in step S3, the controller 11 determines whether a selection operation for the microphone-speaker device 2 has been received. For example, on the setting screen F1 illustrated in FIG. 6, the controller 11 displays images corresponding to the microphone-speaker devices 2A to 2D, respectively, and receives an operation of selecting the microphone-speaker devices 2A to 2D from the user. If the controller 11 receives an operation of selecting one of the microphone-speaker devices 2 (S3: Yes), the controller 11 shifts the processing to step S4. Meanwhile, if the controller 11 does not receive any operation of selecting the microphone-speaker device 2 (S3: No), the controller 11 shifts the processing to step S7.

In step S4, the controller 11 displays setting information of the selected microphone-speaker device 2. For example, as illustrated in FIG. 6, when the microphone-speaker device 2A is selected by the user, the controller 11 displays the current setting information of the microphone-speaker device 2A on the setting screen F1.

Next, in step S5, the controller 11 determines whether a setting operation to set the setting items of the microphone-speaker device 2 has been received from the user. For example, as illustrated in FIG. 6, when the user performs a setting operation to set the setting items of the microphone-speaker device 2A, the controller 11 receives the setting operation. If the controller 11 receives the setting operation from the user (S5: Yes), the controller 11 shifts the processing to step S6. Meanwhile, if the controller 11 does not receive the setting operation from the user (S5: No), the controller 11 shifts the processing to step S7.

In step S6, the controller 11 registers the setting content of the microphone-speaker device 2. For example, as illustrated in FIG. 6, when the user performs a setting operation to set the setting item for mute of the microphone-speaker device 2A to "OFF", the controller 11 sets the setting item for mute of the microphone-speaker device 2A to "OFF". The controller 11 registers the setting content in the setting information D1 (FIG. 4).

Next, in step S7, the controller 11 determines whether the setting operation for the setting items of each of the microphone-speaker devices 2 by the user has been finished. For example, when the user performs a setting operation for the setting items by selecting each of the microphone-speaker devices 2A to 2D in order, and then selects a "Done" button (FIG. 6), the controller 11 determines that the setting operation has been finished (S7: Yes) and shifts the processing to step S8. When the user does not select the "Done" button, the controller 11 determines that the setting operation has not been finished (S7: No) and shifts the processing to step S3. The controller 11 repeatedly executes the processing of steps S3 to S6 until the setting operation by the user is finished.

Next, in step S8, the controller 11 sets a specific area. Specifically, the controller 11 sets a specific place relative to the external speakers 3*a* and 3*b* in the meeting room R1 to the specific area AR1. For example, the controller 11 sets an area including the microphone-speaker devices 2A to 2D in the meeting room R1 (FIG. 2) as the specific area AR1. In this example, the specific area AR1 may be the meeting room R1.

Next, in step S9, the controller 11 starts processing of transmitting and receiving voice data between each of the microphone-speaker devices 2. For example, when the user selects the "Done" button, the controller 11 sets the specific area AR1 and starts transmission and reception of voice data between each of the microphone-speaker devices 2A to 2D. This allows users A to D to conduct a meeting using the microphone-speaker devices 2A to 2D. The controller 11 transmits and receives voice data between the microphone-speaker devices 2A to 2D during the meeting.

Next, in step S10, the controller 11 determines whether the microphone-speaker device 2 has moved into or out of the specific area AR1. If the controller 11 determines that the microphone-speaker device 2 has moved out of the specific area AR1 or determines that the microphone-speaker device 2 has moved into the specific area AR1 (S10: Yes), the controller 11 shifts the processing to step S11. Meanwhile, if the controller 11 determines that the microphone-speaker device 2 has not moved into or out of the specific area AR1 (S10: No), the controller 11 shifts the processing to step S12.

The controller 11 repeatedly executes the processing of estimating the position of each of the microphone-speaker devices 2A to 2D at predetermined intervals during the meeting, thereby ascertaining the position of each of the microphone-speaker devices 2A to 2D in real time.

In step S11, the controller 11 changes the setting content of the microphone-speaker device 2. For example, as illustrated in FIG. 7, when user D who is wearing the microphone-speaker device 2D leaves the meeting room R1 in order to answer a phone call or the like during the meeting, the controller 11 determines that the microphone-speaker device 2D has been moved outside the specific area AR1 from within the specific area AR1 (S10: Yes) and changes the setting content for mute of the microphone-speaker device 2D from "OFF" to "ON" (S11).

Also, when user D who has left the meeting room R1 returns to the meeting room R1, the controller 11 determines that the microphone-speaker device 2D has been moved from outside the specific area AR1 to within the specific area AR1 (S10: Yes) and changes the setting content for mute of the microphone-speaker device 2D from "ON" to "OFF" (S11).

In step S12, the controller 11 determines whether the meeting is ended. For example, when the meeting is ended and connection with each microphone-speaker device 2 is cut, the controller 11 determines that the meeting has been ended. When the meeting is ended (S12: Yes), the controller 11 ends the voice control processing. The controller 11 repeatedly executes the processing of steps S10 and S11 until the meeting is ended (S12: No). The controller 11 may receive a change operation to change the setting content of the microphone-speaker device 2 from the user on the setting screen F1 during the meeting. In this case, the controller 11 changes the setting content of the microphone-speaker device 2 on the basis of the change operation by the user during the meeting. The controller 11 executes the voice control processing as described above.

As described above, the voice processing system 100 according to the present embodiment is a system including a plurality of portable microphone-speaker devices 2 of a portable type carried by users, and communication devices (e.g., the external speakers 3*a* and 3*b*) installed in a predetermined area (e.g., the meeting room R1) in which the users are accommodated. Further, the voice processing system 100 estimates the position of the microphone-speaker device 2 relative to the communication device by executing transmission and reception of voice data between the microphone-speaker device 2 and the communication device, and displays the estimated position of the microphone-speaker device 2 on a display (the operation display 13). Furthermore, the voice processing system 100 displays, on the display, the setting information of the microphone-speaker device 2.

According to the above configuration, the user can easily ascertain the position of each of the microphone-speaker devices 2 by using, for example, the external speakers 3*a* and 3*b* installed in the meeting room R1 as landmarks. Consequently, since the user can easily ascertain the setting content of each of the microphone-speaker devices 2, the setting items of each of the microphone-speaker devices 2 can be set appropriately.

Other Embodiments

The present disclosure is not limited to the above-described embodiment. Other embodiments of the present disclosure will be described below.

Figure 9:
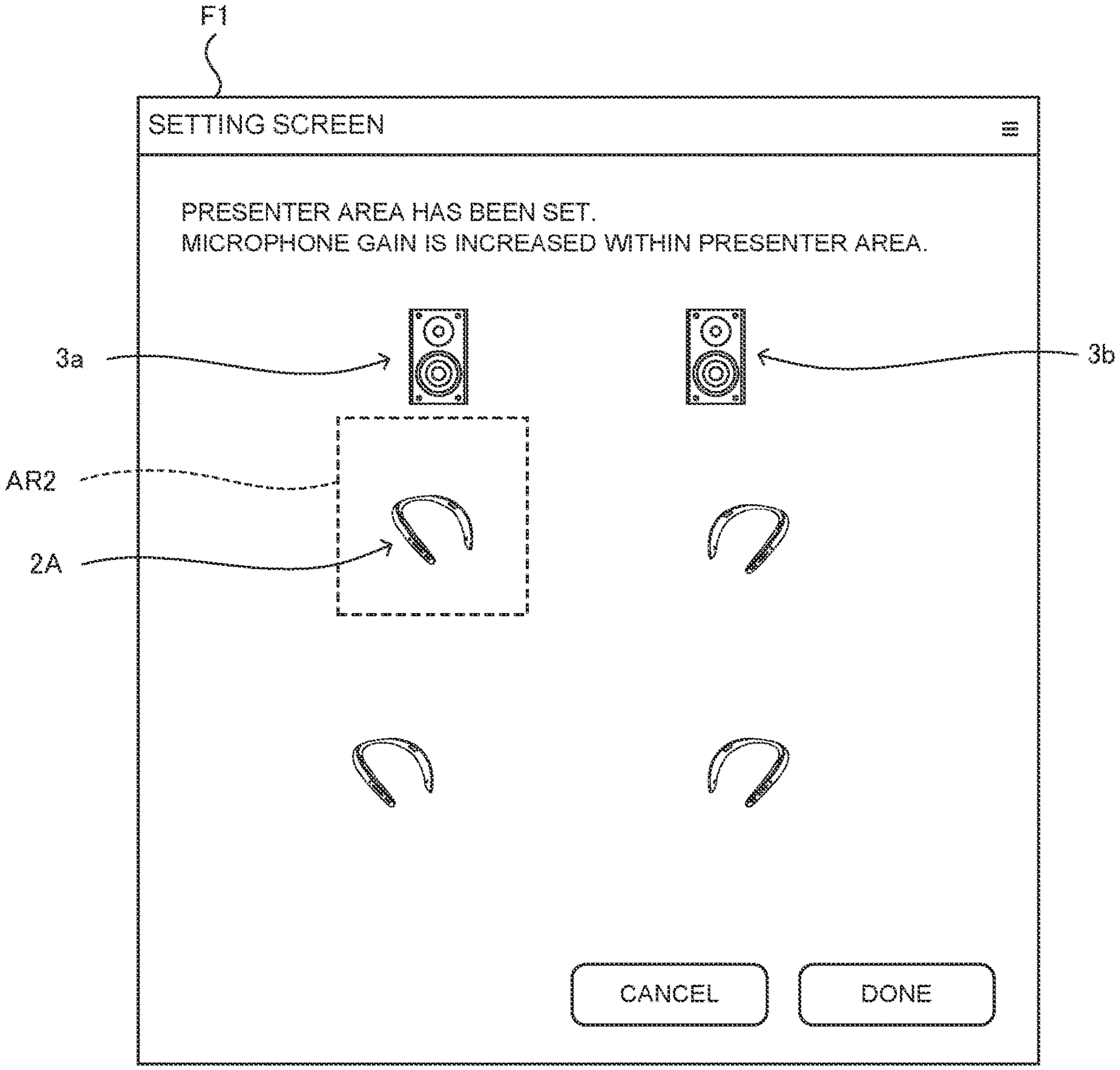
FIG. 9 is a diagram showing an example of a setting screen displayed in a voice processing system according to an embodiment of the present disclosure.

For example, as illustrated in FIG. 9, a setting processing unit 114 may set a place where a presentation or the like is to be made to a specific area AR2. For example, the setting processing unit 114 sets a space for one user at a front part of a meeting room R1 as the specific area AR2 (i.e., a presenter area). A display processing unit 112 displays the specific area AR2 to be identifiable on a setting screen F1, as illustrated in FIG. 9. Here, the setting processing unit 114 increases a microphone gain of a microphone-speaker device 2 located within the specific area AR2 so that the microphone-speaker device 2 of a presenter can reliably collect the presenter's speech voice. In the example illustrated in FIG. 9, since user A is positioned in the specific area AR2 as the presenter, the setting processing unit 114 sets the microphone gain of a microphone-speaker device 2A of user A higher than that of microphone-speaker devices 2B to 2D.

Further, when user A finishes the presentation and moves outside the specific area AR2, the setting processing unit 114 returns the microphone gain of the microphone-speaker device 2A to the original setting value.

Figure 10:
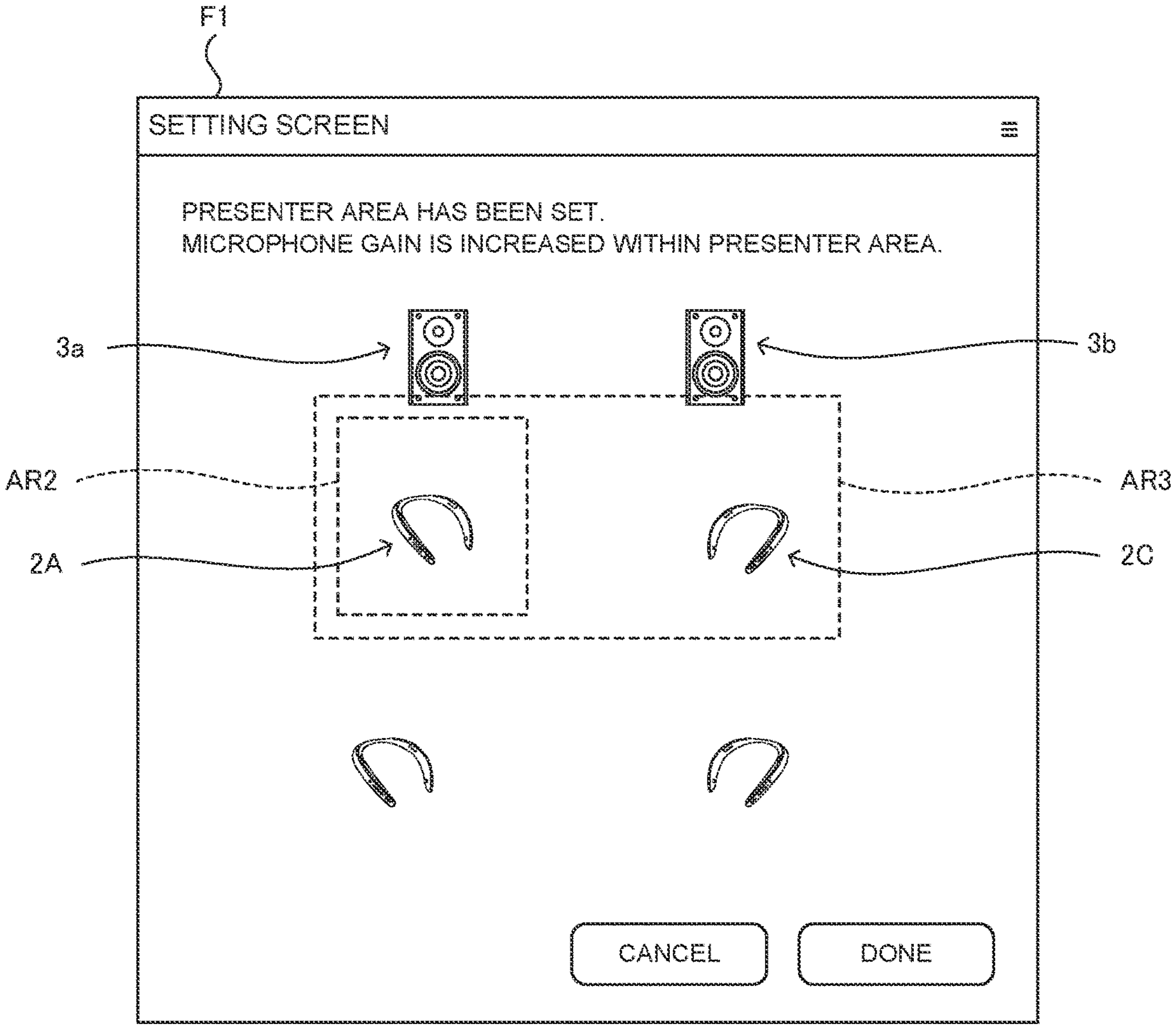
FIG. 10 is a diagram showing an example of a setting screen displayed in a voice processing system according to an embodiment of the present disclosure.

As another embodiment, as illustrated in FIG. 10, for example, the setting processing unit 114 may further set, in addition to the specific area AR2, a specific area AR3 at a place near external speakers 3*a* and 3*b*. The display processing unit 112 displays the specific areas AR2 and AR3 to be identifiable on the setting screen F1, as illustrated in FIG. 10. For example, the setting processing unit 114 sets a space for one user at the front part of the meeting room R1 to the specific area AR2 (the presenter area), and also sets a space at which voices and sounds reproduced from the external speakers 3*a* and 3*b* can be heard to the specific area AR3. For example, when a controller 11 makes the presenter's speech voice be reproduced from the external speakers 3*a* and 3*b*, since users near the external speakers 3*a* and 3*b* can hear voice reproduced from the external speakers 3*a* and 3*b*, there is no need to reproduce the voice from a speaker 25 of the microphone-speaker device 2 of these users.

Thus, the setting processing unit 114 increases the microphone gain of the microphone-speaker device 2 located within the specific area AR2, and also lowers the speaker volume of the microphone-speaker device 2 located within the specific area AR3. In the example illustrated in FIG. 10, since user A is positioned within the specific area AR2 as the presenter and user C is positioned within the specific area AR3 as a listener, the setting processing unit 114 sets the microphone gain of the microphone-speaker device 2A of user A higher than that of the microphone-speaker devices 2B to 2D, and also sets the speaker volume of the microphone-speaker device 2C of user C lower than that of the microphone-speaker devices 2A, 2B, and 2D. The setting processing unit 114 may set the speaker of the microphone-speaker device 2C to OFF ("Mute").

Figure 11:
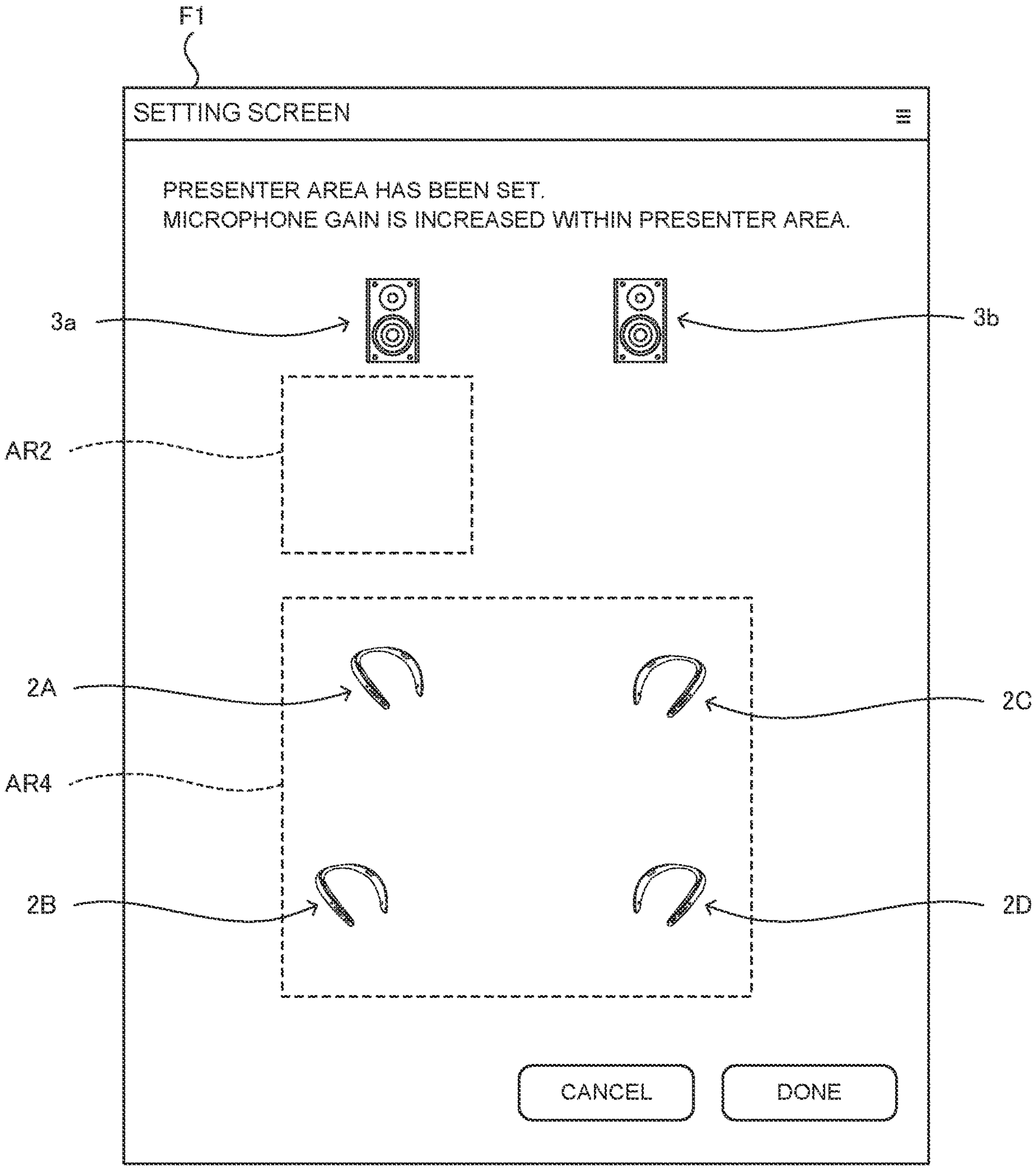
FIG. 11 is a diagram showing an example of a setting screen displayed in a voice processing system according to an embodiment of the present disclosure.

Further, as illustrated in FIG. 11, the setting processing unit 114 may set a space for one user at the front part of the meeting room R1 to the specific area AR2 (the presenter area), and also set a space surrounding a table in the meeting room R1 to a specific area AR4. The specific area AR4 includes the microphone-speaker devices 2A to 2D of users A to D who are seated around the table. A presenter among users A to D moves from the specific area AR4 to the specific area AR2. In this case, the setting processing unit 114 sets the microphone gain of the presenter's microphone-speaker device 2 to high, and also sets the microphone gain of the other users' microphone-speaker devices 2 to low or makes the setting for mute to "ON".

As described above, the setting processing unit 114 may further set the specific areas AR3 and AR4 at specific places relative to the external speakers 3*a* and 3*b*, in addition to the specific area AR2, and set each of a plurality of microphone-speaker devices 2 to have the setting content corresponding to the specific area where those microphone-speaker devices 2 are located.

Further, for example, in a case where air-conditioning equipment such as an air conditioner is installed in the meeting room R1, the setting processing unit 114 may set a specific area at a place near the air-conditioning equipment. In this case, the setting processing unit 114 may enhance a noise suppressor for a microphone 24 of the microphone-speaker device 2 located within the specific area so as to avoid the influence of noise caused by the air-conditioning equipment.

Figure 12:
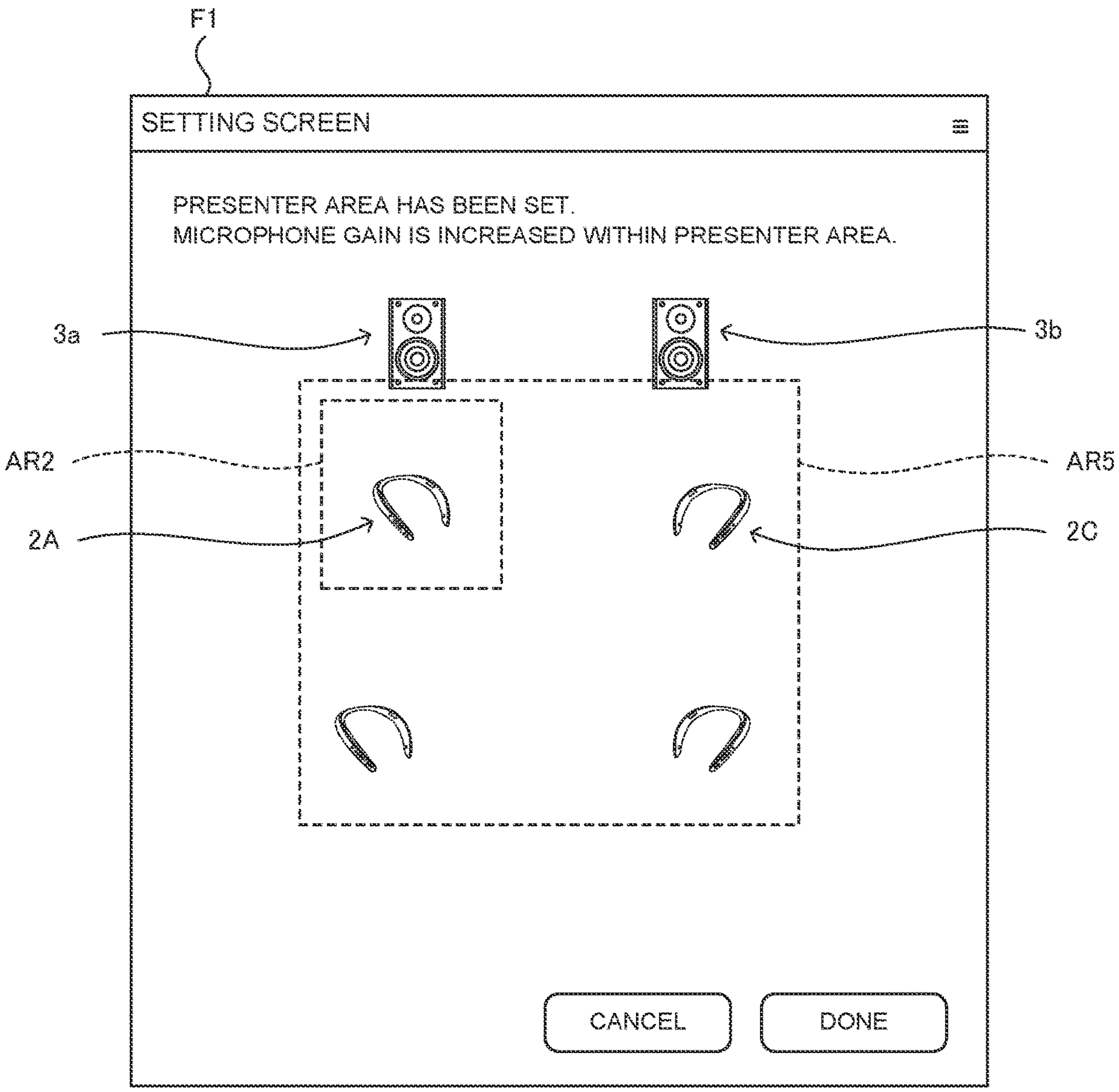
FIG. 12 is a diagram showing an example of a setting screen displayed in a voice processing system according to an embodiment of the present disclosure.

Furthermore, as yet another embodiment, the setting processing unit 114 may set a plurality of specific areas AR such that the specific areas AR overlap one another. For example, as illustrated in FIG. 12, the setting processing unit 114 sets the specific area AR2 (the presenter area) at the front part of the meeting room R1, and also sets a specific area AR5 at a place including the specific area AR2. In this case, the setting processing unit 114 sets the specific area AR5 to an area with low microphone gain. Here, when user A is positioned within the specific area AR2 as the presenter, the setting processing unit 114 sets the microphone gain of the microphone-speaker device 2A to be high. As can be seen, when there exist overlapping specific areas in which the setting contents are different, the setting processing unit 114 may set each of the microphone-speaker devices 2 in accordance with the order of priority corresponding to the use application. In this example, the setting processing unit 114 places a higher priority on the presentation and makes the setting by prioritizing the setting content of the specific area AR2 over the setting content of the specific area AR5.

Further, for example, when users A to D are conducting a meeting in multiple languages, the setting processing unit 114 makes voice of the meeting be reproduced from the microphone-speaker devices 2B to 2D located outside the specific area AR2, which is in the specific area AR5, and makes translated voice corresponding to voice of the meeting be reproduced from the microphone-speaker device 2A located within the specific area AR2, which is in the specific area AR5.

In other words, when the specific area AR2 is included in the specific area AR5, the setting processing unit 114 may set or change the setting content and a sound source (reproduction content) by placing a higher priority on the use application of the specific area AR2. As described above, when the specific area AR2 overlaps a part of the specific area AR5, the setting processing unit 114 may make the setting such that the setting content of the microphone-speaker device 2 located at the overlapping part reflects the setting content corresponding to the specific area AR2.

Further, when the specific area AR2 overlaps a part of the specific area AR5, the setting processing unit 114 may set a reproduction sound source of the microphone-speaker device 2 that is located inside the specific area AR5 and outside the specific area AR2 to a first sound source, and set a reproduction sound source of the microphone-speaker device 2 that is located inside the specific area AR2 and at a part overlapping the specific area AR5 to a second sound source.

Figure 13:
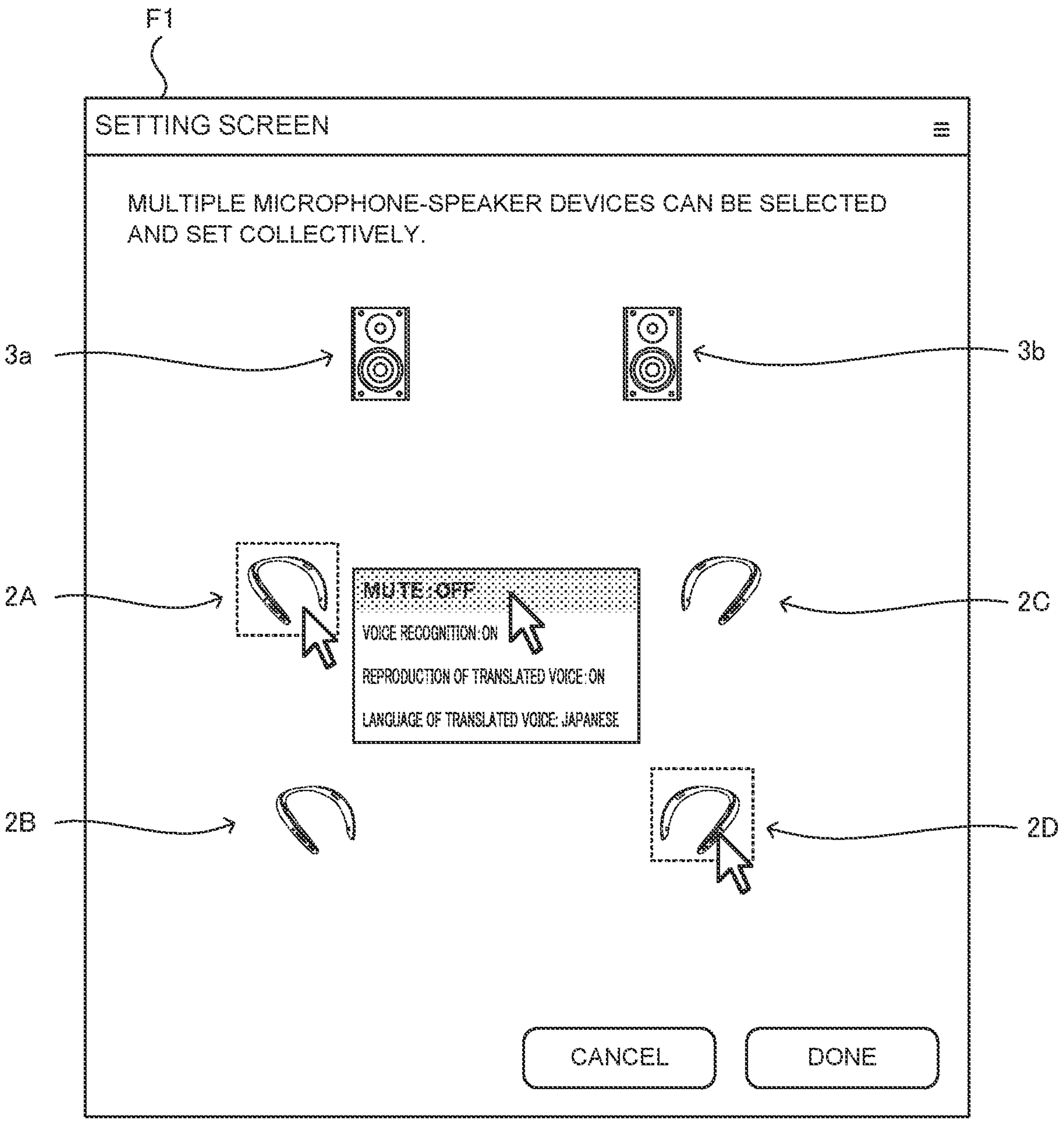
FIG. 13 is a diagram showing an example of a setting screen displayed in a voice processing system according to an embodiment of the present disclosure.

As yet another embodiment, the user may select a plurality of microphone-speaker devices 2 on a setting screen F1, and perform an operation to set the setting items collectively. For example, as illustrated in FIG. 13, when the user selects respective images of the microphone-speaker devices 2A and 2D and changes the setting for mute to "OFF", the setting processing unit 114 collectively sets the microphone-speaker devices 2A and 2D to "OFF" for mute.

As described above, the setting processing unit 114 may receive, on an operation display 13, an operation of selecting each of a plurality of microphone-speaker devices 2 from the user, group the plurality of microphone-speaker devices 2 selected by the user, and set the setting items for each of the grouped microphone-speaker devices 2. For example, the setting processing unit 114 may set the reproduction language of the grouped microphone-speaker devices 2, or assign weights to the speech of the users of the grouped microphone-speaker devices 2 in the minutes and set the level of importance to the speech.

Further, the display processing unit 112 may color the frames surrounding images of the grouped microphone-speaker devices 2, or vary the line type of the frames, for example, so that the grouped microphone-speaker devices 2 can be displayed to be distinguished from the other microphone-speaker devices 2 or other grouped microphone-speaker devices 2. This allows the user to ascertain the grouped microphone-speaker devices 2 at a glance.

Next, other methods of estimating the position of the microphone-speaker device 2 will be described. For example, each of the microphone-speaker devices 2 may be provided with a communication function such as a beacon, a tag, or the like. In this case, an estimation processing unit 111 can make signals of different frequencies be output from the external speakers 3*a* and 3*b* and estimate the position of each of the microphone-speaker devices 2 on the basis of a difference in arrival time, i.e., the time when each of the microphone-speaker devices 2 has received the signals.

Furthermore, as another example, when a plurality of microphones (microphone array), instead of the external speakers 3*a* and 3*b*, are installed in the meeting room R1, the estimation processing unit 111 can make a specific sound (a test sound, etc.) be reproduced from the microphone-speaker device 2, and estimate the position of the aforementioned microphone-speaker device 2 on the basis of a difference in arrival time, i.e., the time when the microphone array has collected the specific sound. The microphone array is one example of the communication device of the present disclosure.

Further, as yet another example, when a communication instrument (a receiver) such as a beacon or a tag is installed in the meeting room R1, the estimation processing unit 111 can make a signal be output from the microphone-speaker device 2, and estimate the position of the microphone-speaker device 2 on the basis of a difference in arrival time, i.e., the time when the receiver has received the signal. The communication instrument (receiver) such as the beacon or tag is one example of the communication device of the present disclosure.

In the embodiments described above, the controller 11 displays the setting screen F1 on the operation display 13, but as other embodiments, the controller 11 may display the setting screen F1 on a device different from the control device 1 (i.e., a personal computer, a display, etc.). Further, the controller 11 may upload data on the setting screen F1 to a cloud server, and the cloud server may allow the other devices to display the setting screen F1. For example, the cloud server may allow a smartphone of the user who attends the meeting to display the setting screen F1. By virtue of this feature, the user can ascertain the position and the setting content of each of the microphone-speaker devices 2 on his/her smartphone.

The voice processing system of the present disclosure may be configured from the control device 1 alone or may be configured by combining the control device 1 with other servers such as a meeting server.

Supplementary Notes of Disclosure

An outline of the disclosure derived from the above embodiments will be described as supplementary notes. The configurations and the processing functions described in the following supplementary notes can be selected to be added or deleted and combined arbitrarily.

Supplementary Note 1

A voice processing system including a microphone-speaker device of a portable type carried by a user, and a communication device installed in a predetermined area in which the user is accommodated, the voice processing system comprising:

- an estimation processing unit which estimates a position of the microphone-speaker device relative to the communication device by executing transmission and reception of data between the microphone-speaker device and the communication device; and a display processing unit which displays, on a display, the position of the microphone-speaker device estimated by the estimation processing unit.

Supplementary Note 2

The voice processing system according to Supplementary Note 1, wherein the display processing unit displays, on the display, setting information of the microphone-speaker device.

Supplementary Note 3

The voice processing system according to Supplementary Note 2, further comprising a setting processing unit which receives, on the display, a setting operation for a setting item of the microphone-speaker device from the user, and sets the setting item according to the setting operation.

Supplementary Note 4

The voice processing system according to any one of Supplementary Notes 1 to 3, wherein:

the voice processing system includes a plurality of microphone-speaker devices each corresponding to the microphone-speaker device; and the voice processing system further comprises a setting processing unit which sets a specific place relative to the communication device to a first specific area, and varies setting content between a first microphone-speaker device located within the first specific area among the plurality of microphone-speaker devices and a second microphone-speaker device Supplementary Note 5

The voice processing system according to Supplementary Note 4, wherein the setting processing unit sets a microphone and a speaker of the second microphone-speaker device to OFF.

Supplementary Note 6

The voice processing system according to Supplementary Note 4 or 5, wherein the setting processing unit sets a microphone gain of the first microphone-speaker device higher than a microphone gain of the second microphone-speaker device.

Supplementary Note 7

The voice processing system according to any one of Supplementary Notes 4 to 6, wherein the setting processing unit further sets a second specific area, which is a specific place relative to the communication device and is different from the first specific area, and sets each of the plurality of microphone-speaker devices to have setting content corresponding to the specific area where each of the microphone-speaker devices is located.

Supplementary Note 8

The voice processing system according to any one of Supplementary Notes 4 to 7, wherein when the second specific area overlaps a part of the first specific area, the setting processing unit makes setting such that setting content of the microphone-speaker device located at an overlapping part reflects setting content corresponding to the second specific area.

Supplementary Note 9

The voice processing system according to any one of Supplementary Notes 4 to 8, wherein when the second specific area overlaps a part of the first specific area, the setting processing unit sets a reproduction sound source of the microphone-speaker device that is located inside the first specific area and outside the second specific area to a first sound source, and sets a reproduction sound source of the microphone-speaker device that is located inside the second specific area and at a part overlapping the first specific area to a second sound source.

Supplementary Note 10

The voice processing system according to any one of Supplementary Notes 1 to 9, wherein:

the voice processing system includes a plurality of microphone-speaker devices each corresponding to the microphone-speaker device; and the voice processing system further comprises a setting processing unit which receives, on the display, an operation of selecting the microphone-speaker device from the user, groups the plurality of microphone-speaker devices selected by the user, and sets a setting item for each of the grouped plurality of microphone-speaker devices.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A voice processing system including a plurality of microphone-speaker devices, each of which is a portable type carried by a user, and a communication device installed in a predetermined area in which the user is accommodated, the voice processing system comprising:

an estimation processing circuit which estimates a position of each of the plurality of microphone-speaker devices relative to the communication device by executing transmission and reception of data between each of the plurality of microphone-speaker devices and the communication device;

a display processing circuit which displays, on a display, the position of each of the plurality of microphone-speaker devices estimated by the estimation processing circuit; and a setting processing circuit which sets a specific place, relative to the communication device, to a first specific area, and makes different setting content between a first microphone-speaker device, among the plurality of microphone-speaker devices, located within the first specific area and a second microphone-speaker device, among the plurality of microphone-speaker devices, located outside the first specific area.

2. The voice processing system according to claim 1, wherein the display processing circuit further displays, on the display, setting information of at least one microphone-speaker device among the plurality of microphone-speaker devices.

3. The voice processing system according to claim 2, wherein the setting processing circuit receives, on the display, a setting operation for a setting item of the at least one microphone-speaker device from the user, and sets the setting item according to the setting operation.

4. The voice processing system according to claim 2, wherein the setting processing circuit:

receives, on the display, an operation of selecting a set of microphone-speaker devices, among the plurality of microphone-speaker devices, from the user, groups the set of microphone-speaker devices selected by the user, and sets a setting item for each of the grouped set of microphone-speaker devices.

5. The voice processing system according to claim 1, wherein the setting processing circuit sets a microphone and a speaker of the second microphone-speaker device to OFF.

6. The voice processing system according to claim 1, wherein the setting processing circuit sets a microphone gain of the first microphone-speaker device higher than a microphone gain of the second microphone-speaker device.

7. The voice processing system according to claim 1, wherein the setting processing circuit further sets a second specific area, which is a specific place relative to the communication device and is different from the first specific area, and sets each of the plurality of microphone-speaker devices to have setting content corresponding to a specific area where each of the plurality of microphone-speaker devices is located.

8. The voice processing system according to claim 7, wherein, when the second specific area overlaps a part of the first specific area, the setting processing circuit makes a setting such that setting content of a microphone-speaker device, among the plurality of microphone-speaker devices, located at an overlapping part reflects setting content corresponding to the second specific area.

9. The voice processing system according to claim 7, wherein, when the second specific area overlaps a part of the first specific area, the setting processing circuit sets a reproduction sound source of a microphone-speaker device, among the plurality of microphone-speaker devices, that is located inside the first specific area and outside the second specific area to a first sound source, and sets a reproduction sound source of another microphone-speaker device, among the plurality of microphone-speaker devices, that is located inside the second specific area and at a part overlapping the first specific area to a second sound source.

10. A voice processing method which involves use of a plurality of microphone-speaker devices, each of which is a portable type carried by a user, and a communication device installed in a predetermined area in which the user is accommodated, the voice processing method being executed by one or more processors and comprising:

estimating a position of each of the plurality of microphone-speaker devices relative to the communication device by performing transmission and reception of data between each of the plurality of microphone-speaker devices and the communication device;

displaying the estimated position of each of the plurality of microphone-speaker devices on a display;

setting a specific place, relative to the communication device, to a first specific area; and making different setting content between a first microphone-speaker device, among the plurality of microphone-speaker devices, located within the first specific area and a second microphone-speaker device, among the plurality of microphone-speaker devices, located outside the first specific area.

11. A non-transitory computer-readable recording medium having recorded thereon a voice processing program comprising instructions for a plurality of microphone-speaker devices, each of which is a portable type carried by a user, and a communication device installed in a predetermined area in which the user is accommodated, the voice processing program causing one or more processors to execute:

estimating a position of each of the plurality of microphone-speaker devices relative to the communication device by performing transmission and reception of data between each of the plurality of microphone-speaker devices and the communication device;

displaying the estimated position of each of the plurality of microphone-speaker devices on a display;

setting a specific place, relative to the communication device, to a first specific area; and making different setting content between a first microphone-speaker device, among the plurality of microphone-speaker devices, located within the first specific area and a second microphone-speaker device, among the plurality of microphone-speaker devices, located outside the first specific area.

* * * * *